United States Patent [19]
Howell et al.

[11] Patent Number: 6,096,984
[45] Date of Patent: Aug. 1, 2000

[54] ADJUSTABLE TOUCHPAD

[75] Inventors: Bryan F. Howell; Steven D. Gluskoter, both of Austin, Tex.

[73] Assignee: Dell USA, L.P., Round Rock, Tex.

[21] Appl. No.: 08/784,569

[22] Filed: Jan. 21, 1997

[51] Int. Cl.[7] .................................................. G08C 21/00
[52] U.S. Cl. .................................... 178/18.01; 178/18.03; 178/18.05; 178/18.06; 178/18.07
[58] Field of Search ..................................... 345/156, 157, 345/159, 160, 162, 169, 172, 173; 178/18.01, 18.03, 18.05, 18.06, 18.07, 18.1

[56] References Cited

U.S. PATENT DOCUMENTS

| | | | |
|---|---|---|---|
| 4,951,036 | 8/1990 | Grueter et al. | 345/173 |
| 5,164,713 | 11/1992 | Bain | 345/157 |
| 5,327,161 | 7/1994 | Logan et al. | 345/157 |
| 5,424,756 | 6/1995 | Ho et al. | 345/158 |
| 5,469,194 | 11/1995 | Clark et al. | 345/173 |
| 5,473,347 | 12/1995 | Collas et al. | 345/169 |
| 5,491,477 | 2/1996 | Clark et al. | 345/163 |
| 5,543,588 | 8/1996 | Bisset et al. | 178/18 |
| 5,543,591 | 8/1996 | Gillespie et al. | 178/18 |
| 5,717,431 | 2/1998 | Chia-Ying et al. | 345/168 |
| 5,748,185 | 5/1998 | Stephan et al. | 345/173 |
| 5,764,218 | 6/1998 | Della Bone et al. | 345/157 |

OTHER PUBLICATIONS

Peter N. Skillman, John W. Lai, and Dennis J. Boyle, "Ergonomic Keyboard For A Portable Computer And Methods Of Operation And Manufacture Therefor", Jan. 5, 1996, 08/583,267, 42 Pages, 9 Sheets of drawings (Figs. 1–10), (Copy Not Enclosed).

Dennis J. Boyle, Bryan F. Howell, John W. Lai, Peter N. Skillman, and Christopher J. Stringer, "Ergonomic Keyboard For A Portable Computer And Methods Of Operation And Manufacture Therefor," Nov. 6, 1996, 08/746,612, 50 Pages, 9 Sheets of drawings (Figs. 1–10), (Copy Not Enclosed).

Dennis J. Boyle, John W. Lai, Peter N. Skillman, and Christopher J. Stringer, "Ergonomic Keyboard For A Portable Computer And Methods Of Operation And Manufacture Therefor," Nov. 12, 1996, 08/747,572, 50 Pages, 9 Sheets of drawings (Figs. 1–10), (Copy Not Enclosed).

Steven D. Gluskoter, Bryan F. Howell, and Christopher J. Stringer, "Ergonomic Keyboard For A Portable Computer And Methods Of Operation And Manufacture Therefor," Nov. 12, 1996, 08/745,455, 46 Pages, 10 Sheets of Drawings (Figs. 1–11), (Copy Not Enclosed).

PC Magazine, "Point to Point", vol. 4, Part 12, Dec. 1991, pp. 102–3, 106,109, and 112.

Linda Stuart, "Touch and Tap vs. Grip and Glide", vol. 20, No. 4; Apr. 1995, pp. IC2–IC3.

Synaptics, Synaptics Touchpad Standard–Module Model TM1002S.

*Primary Examiner*—Vijay Shankar
*Attorney, Agent, or Firm*—Skjerven, Morrill, MacPherson, Franklin & Friel, LLP; David G. Dolezal

[57] ABSTRACT

A touchpad assembly capable of providing an operating surface of a touchpad in a plurality of operating positions. The operating assembly can be adjusted by changing the orientation of the operating surface of the touchpad or by changing the form of the operating surface. The touchpad assembly including a supporting device for supporting the operating surface.

28 Claims, 12 Drawing Sheets

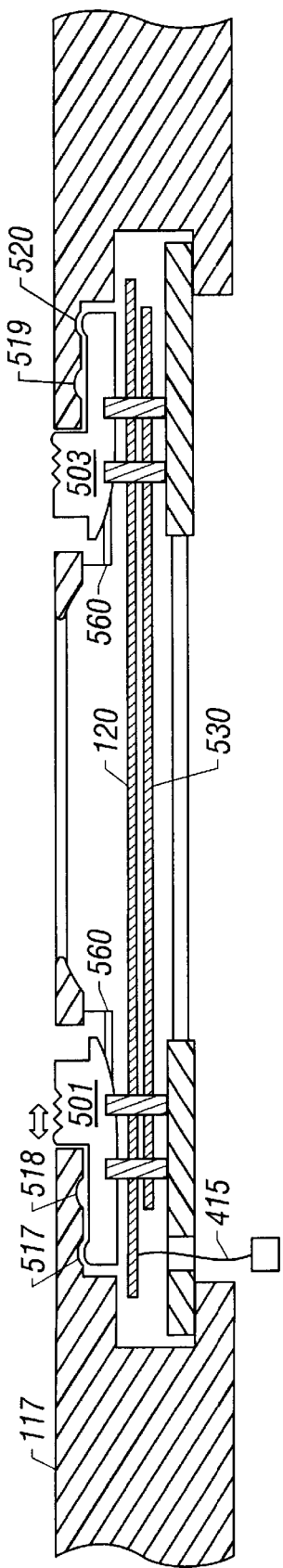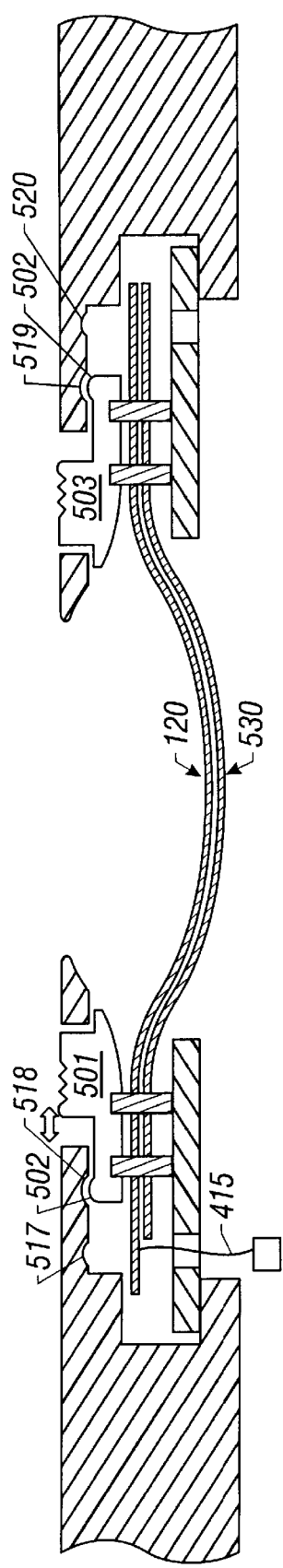
FIG. 5B
FIG. 5C

ADJUSTABLE TOUCHPAD

BACKGROUND OF THE INVENTION

1. Field of the Invention

The present invention relates to a computer system and more particularly to a an adjustable user input device for controlling cursor movement in a computer system.

2. Description of the Related Art

Computer systems in general and International Business Machines (IBM) compatible personal computer systems in particular have attained widespread use for providing computer power to many segments of today's modern society. A personal computer system can usually be defined as a desk top, floor standing, or portable computer that includes a system unit having a system processor and associated volatile and non-volatile memory, a display monitor, a keyboard, one or more diskette drives, a fixed disk storage device and an optional printer. One of the distinguishing characteristics of these systems is the use of a system board or mother board to electrically connect these components together. These personal computer systems are information handling systems which are designed primarily to give independent computing power to a single user and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices.

These personal computer systems are information handling systems which are designed primarily to give independent computing power to a single user or group of users and are inexpensively priced for purchase by consumers such as by individuals or small businesses.

Portable, battery-powered portable computers have become increasingly popular over the last several years due to their light weight and small size that permit them to be easily hand-carried in an ordinary briefcase and used by business travelers in cramped spaces, such as on airline seat back trays, lacking electrical plug-in facilities. Portable computers are often referred to as laptop, notebook, or subnotebook computers. These computers typically incorporate a flat panel display such as a liquid crystal display (LCD) or other relatively small display in the lid portion. The portable computer also incorporates both a hard and floppy disc drives, and a keyboard built into its main body portion. It is a fully self-contained computer system able to be conveniently used, for at least short periods of time, in situations and locations in which the use of a much larger desktop computer is not feasible.

The increase in the popularity of computer systems has been fueled by the improvement in the input devices used to facilitate the human interaction with these computer systems. In the past, the primary input device simply consisted of a keyboard. The human operator entered data by typing on alpha-numeric, special function, and arrow keys from the keyboard. The entered data was usually displayed on a display monitor.

Subsequently, a more sophisticated and user-friendly interface encompassing the use of a cursor to perform editing and selection functions was developed. Typically, an input device coupled to the computer system is manipulated by the user to control the movement of a cursor on the display monitor. One or more buttons are used to perform the desired selection functions. For example, a user can place a cursor over an icon displayed on the display monitor. Thereupon the icon can be selected by clicking the button. This "point-and-click" feature has proven to be extremely popular and has gained wide acceptance.

There are several different types of input devices for controlling the cursor that are commercially available today. Some of these types include a mouse, a trackball, a joystick, a writing pen, a stylus tablet, to name a few.

The latest cursor controlling device for a computer system is the touchpad or trackpad. One type of touchpad uses field-distortion or capacitive sensing technology.

Two layers of electrodes are arranged in a grid on the pad's flat planar surface to create an electrical field. Finger movement on the touchpad distorts the electrical field allowing the cursor movement to be controlled by the touch of a finger. A user moves the cursor or arrow on their computer display monitor by gliding their finger across the touchpad. To select items or launch applications, the user lightly taps the touch pad surface once or twice.

Touchpads require less space to operate than a mouse, therefore, they are more suitable for portable computers than a mouse. Touchpads are superior to trackballs in that they contain no moving parts and they do not get clogged or gummed up with dirt.

One problem with touchpads is that they require a wider range of finger motion to operate than a track ball. A track ball requires a minimal amount of finger movement, approximately a ¼ of an inch circle around the device. With a touchpad however, the user is required to incorporate the full width and length of the pad, approximately 1½ to 2 inches, to move the cursor. With a flat touch pad, this increased area of coverage by the finger may require movement of the entire hand and arm to operate the touchpad. The increase in arm movement of the computer causes a slower response time and a definite break in the typing rhythm.

Although touchpads are usually flat or planar, touchpads can also be non-planar as well. An outwardly non-planar operating surface advantageously provides the computer system with an input device that protrudes outward away from the base portion, thereby minimizing the area on the top surface of the base portion needed for the touch pad. Also, the outwardly non-planar surface advantageously provides a cursor moving and input device with better ergonomics where the user has a smaller area to traverse the entire pad.

Another advantage of this outwardly non-planar operating surface is that it provides the user with a partially vertical operating surface. This partially vertically surface enables the user to move the cursor with a partial vertical motion of a finger instead of with only a horizontal motion as with a non-planar surface. This partially vertical motion for cursor control provides for better ergonomics. In addition, a protruding operating surface enables the cursor to be controlled with a partially vertical motion from a side of the touch pad where such a motion is easier to make while typing than a purely horizontal motion with a flat operating surface. Thus, there is less hand movement required to contact the operating pad.

Inwardly non-planar touchpads also provide advantages not available with planar touch pads. Because the human figure rotates on a joint, the natural movement of the figure is in an inward arching motion. Thus, a touchpad with an operating surface that follows this motion would require less hand movement in controlling a cursor.

Because different users have different typing styles, a touchpad operating surface ideal for one user may slow down the typing speed of another user.

Another way to advantageously make a touchpad adjustable is to allow a user to orient the touchpad in variety of ways with respect to the computer system. Because touchpads are not symmetrically global, certain orientations of the touchpad are more convenient for users with different typing styles. It is known that a computer system is able to detect an orientation of a touchpad in a computer system and adjust the cursor control movements according to the orientation. Clark et al., U.S. Pat. No. 5,469,194, teaches one method of compensating for a physical orientation of a touch pad relative to the display screen. This method allows for a horizontal movement on the touch pad operating surface to cause a horizontal movement of the cursor independent of which orientation is used.

What is needed is an input device that will improve the ergonomics of using the touchpad by allowing each individual user the ability to adjust the operating surface of the touchpad to a number of various operating positions by changing the form of the operating surface or by changing the orientation of the operating surface. What is also needed is a touchpad that can be adjusted by a user to fit the specific needs of the user in operating a computer. What is further desired is a touchpad that allows the user to adjust the form or orientation of the operating surface in a convenient, and inexpensive way, and without the use of tools.

SUMMARY OF THE INVENTION

It has been discovered that providing a computer system with an adjustable touchpad operating surface advantageously provides a cursor moving device that is more ergonomically efficient for a computer user.

More specifically, in one aspect of the invention, a computer system includes a processor, a display electrically coupled to the processor, and a touchpad assembly. The touchpad assembly includes a touchpad having an operating surface electrically coupled to the processor. The touchpad assembly capable of providing the operating surface in a plurality of operating positions.

In another aspect of the invention, a method for inputting data into a computer system includes providing a touchpad with an operating surface, electrically coupling the operating surface to a processor of the computer system, and positioning the operating surface in an operating position where the operating surface has a first form and has a first orientation relative to the computer system. The method also includes adjusting the operating surface of the touchpad and inputting data into the computer system using the operating surface of the touchpad.

A touchpad assembly with an adjustable operating surface advantageously provides a user with better ergonomics in using the touchpad. It allows the individual user the ability to adjust and customize the operating surface of the touchpad to a number of various operating positions by changing the form of the operating surface or by changing the orientation of the operating surface. It also allows the user to adjust or customize the operating surface of the touchpad to the specific needs of the user in operating a specific program.

BRIEF DESCRIPTION OF THE DRAWINGS

The present invention may be better understood, and its numerous objects, features, and advantages made apparent to those skilled in the art by referencing the accompanying drawings.

FIG. 5B shows a sectional view of one embodiment of a touchpad assembly in an operating position.

FIG. 5C shows a sectional view of one embodiment of a touchpad assembly in an operating position.

DESCRIPTION OF THE PREFERRED EMBODIMENT(S)

The following sets forth a detailed description of the best contemplated mode for carrying out the invention. The description is intended to be illustrative of the invention and should not be taken to be limiting.

Figure 1:
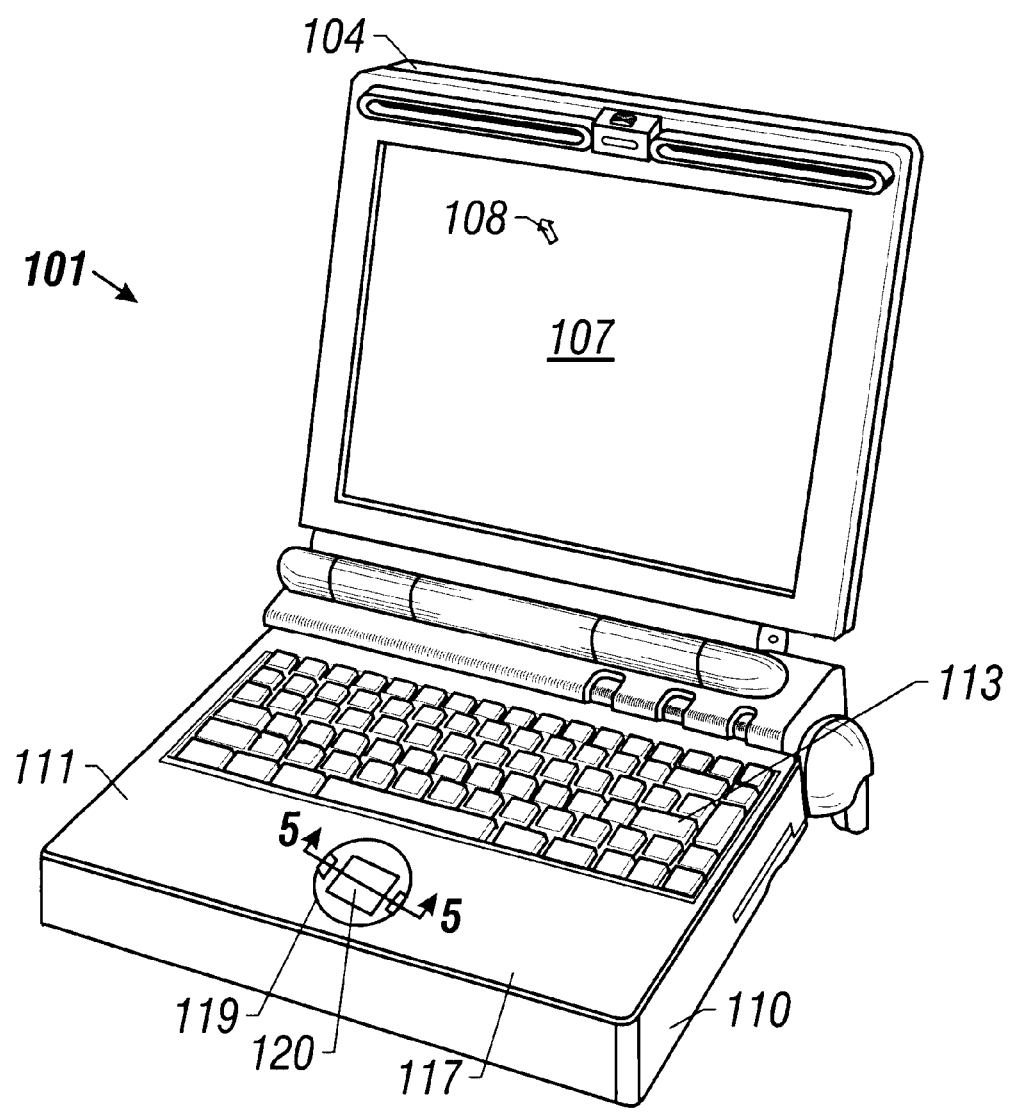
FIG. 1 shows a perspective view of a computer system with a touchpad assembly in an operating position.

Referring to FIG. 1, a portable computer 101 is one embodiment of a computer system. Portable computer 101 includes a lid portion 104 having an LCD monitor or other type of display 107 for providing information to a user and displaying icons during operation. When operating, the display 107 also displays a cursor 108. The cursor is used to input information into the computer 101 by highlighting or selecting areas of the display 107. The portable computer 101 also includes a base portion 110. The housing encasing the base portion 110 has a top side surface 111 facing a user when the computer is being operated. The top side surface 111 includes a keyboard 113.

The portable computer 101 includes a palm rest 117 which is located on the top side surface 111 between a user and the key board. Attached to the palm rest 117 is the touchpad assembly 119. Touchpad assembly 119 has an operating surface 120 that a user touches to control the movement of the cursor 108 on the display 107 and to input information into the computer 101 by such methods as tapping the touchpad operating surface 120 when the cursor 108 is located over a desired area of the display 107.

The portable computer also includes within the base portion 110 a processor (not shown), a system board or mother board (not shown) electrically coupled to the processor, and a volatile or non-volatile memory (not shown) electrically coupled to the processor.

Figure 2:
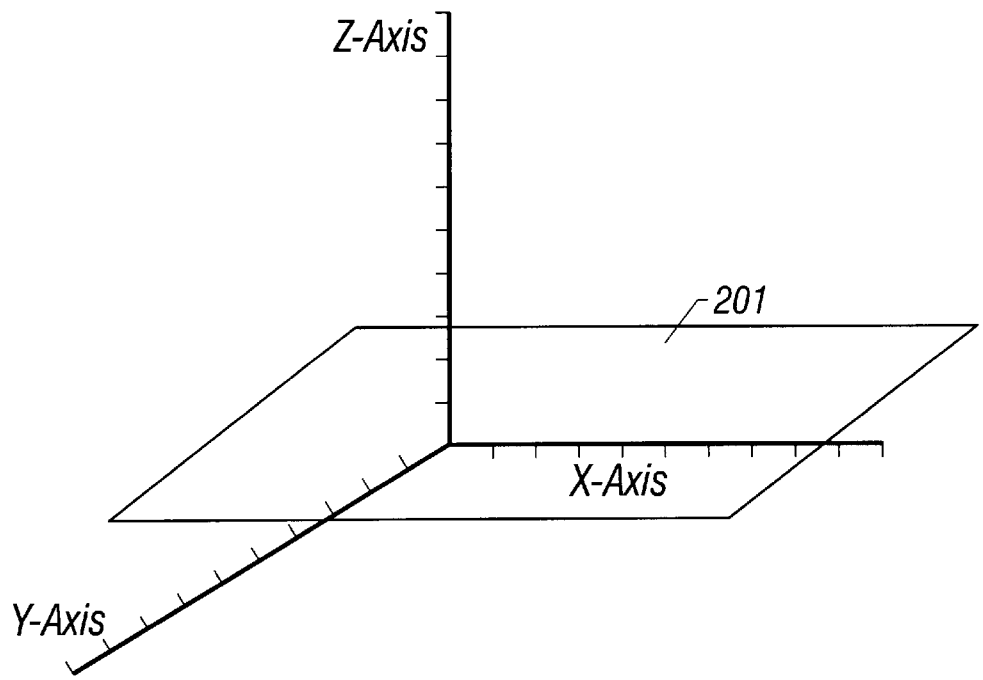
FIG. 2 shows a geometric shape of the operating surface of a touchpad.

Referring to FIG. 2, a typical touch pad has an operating surface 201 that is usually flat or planar. In other words, the entire operating surface generally resides in a single X-Y plane as shown in FIG. 2.

Figure 3:
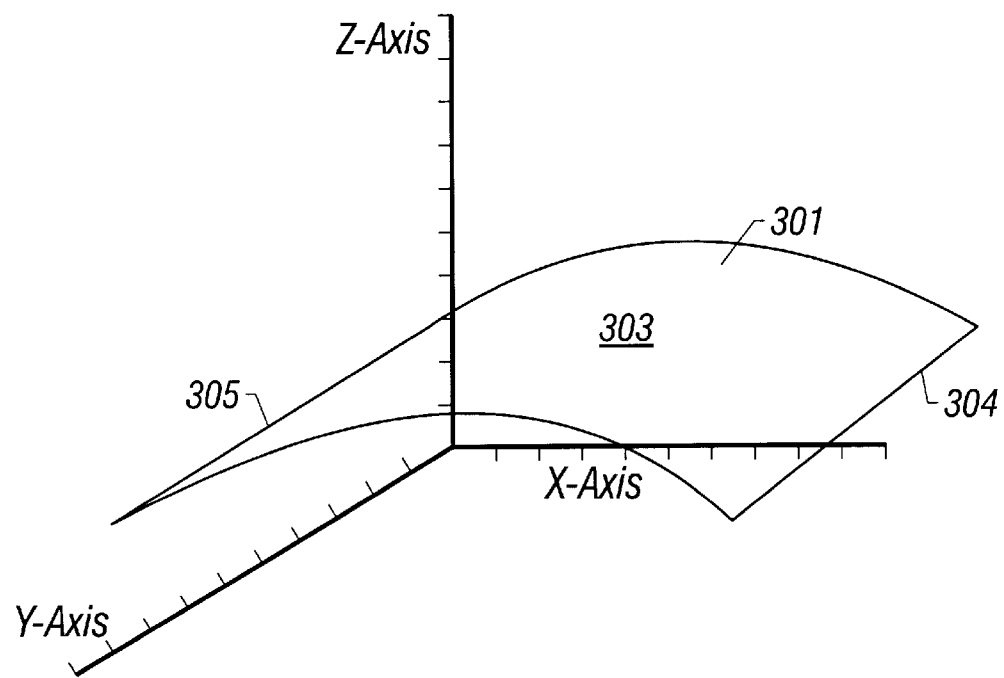
FIG. 3 shows a geometric shape of the operating surface of a touchpad.

Referring to FIG. 3, the operating surface 301 is an outwardly non-planer form. The operating surface 301 is non-planar in that it resides in a plurality of successive X-Y planes. The operating surface 301 is of a rectangular shape and forms an arch as though it were part of the outer surface of a cylinder. The edge portions 304 and 305 reside in the same X-Y plane, and other portions 303 reside in other X-Y planes. Thus, the operating surface 301 shown is non-planer.

The operating surface 301 is outwardly non-planar meaning that if the shape of the operating surface 301 were rigid and were to lie or rest on an X-Y plane, a part of the middle portion 303 would be at a higher plane than part of the edge portions 304 and 305.

Figure 4:
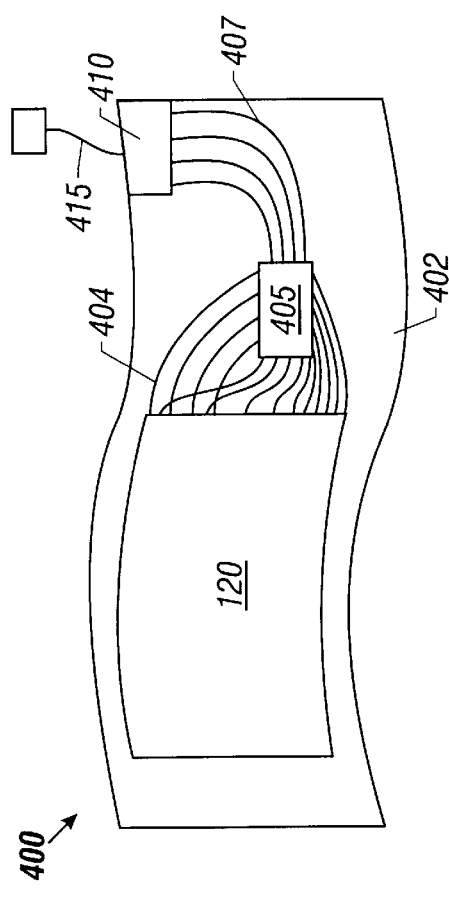
FIG. 4 shows a perspective view of a touchpad.

FIG. 4 shows one embodiment of a touchpad used in the present invention. Touchpad 400 utilizes capacitive sensing technology to input data and control cursor 107 movement. Touch pad 400 has an operating surface 120 that includes a grid array of capacitive lines. By tapping or touching the operating surface, a user is able to distort the electrical field allowing the touch pad to sense finger location on the operating surface 120. The touchpad 400 also includes a substrate portion 402. In the embodiment shown, the substrate portion surrounds the operating surface of the touch pad. Attached to the substrate 402 is connection leads 404 for attaching the operating surface 120 to a touch pad controller 405, which is also attached to the substrate 402. Connection leads 407 attach the controller 405 to connector 410 which is attached to a mother board connector 415. Motherboard connector 415 includes a plurality of leads for coupling the touchpad 400 to the computer system mother board (not shown) that resides within the base portion 110 of computer system 101. Both the operating surface 120 and the substrate portion 402 are of a flexible and thin construction. One type of touchpad that may be used is a Synaptics Inc. touchpad, PWB 920-000153 REV B.

In other embodiments of the invention, a pressure sensitive touchpad may be used. With a pressure sensitive touchpad, the pressure of a user's finger on a membrane switch array within the operating surface 120 provides output control signals for cursor control.

The touch pad 401 may be a position sensing unit which senses the actual position of a finger or pointer on the operating surface 120, where the position on the operating surface 120 corresponds to a specific position on the display 107. Alternatively, the touchpad may sense the direction of finger movement on the operating surface 120 as indicative of the desired movement of the cursor 108 from its present location on the display 107.

Figure 5A:
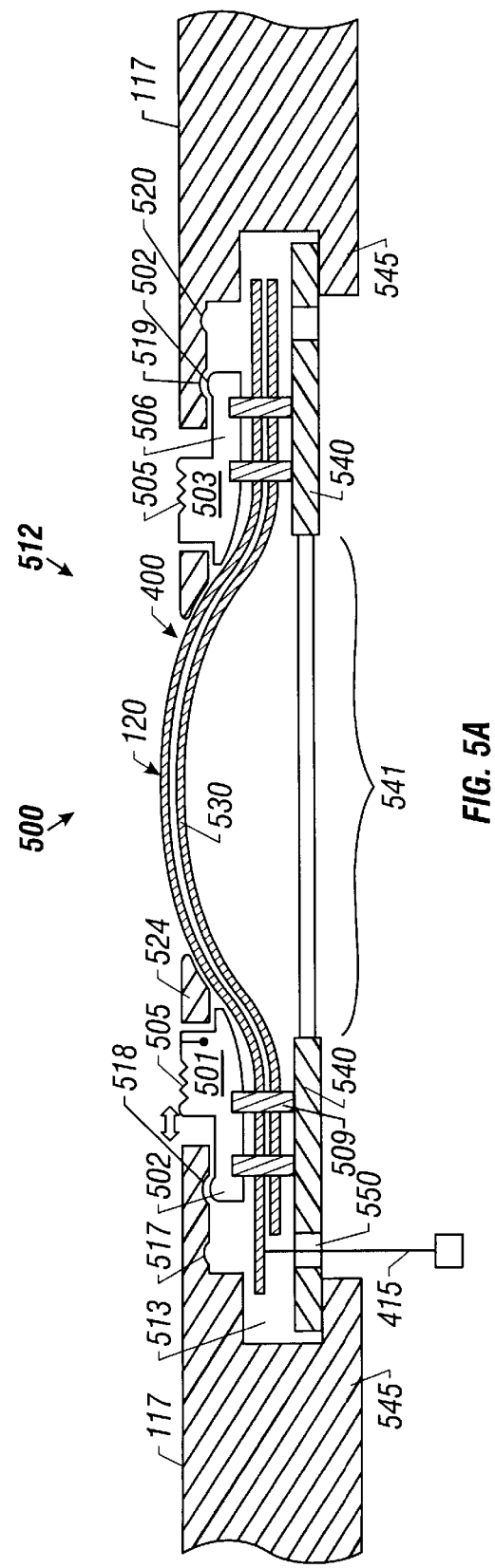
FIG. 5A shows a sectional view of one embodiment of a touchpad assembly in an operating position.

FIG. 5A shows a side profile of a first embodiment of an adjustable touchpad system. Touch pad assembly 500 is located within a recess 512 of the palm rest 117 of the portable computer 101. Included within the touchpad assembly 500 is the touchpad 400, the support device 530, the face plate structure 524 and adjustment tabs 501 and 503. Touchpad 400 is attached with anchor pins 509 to the support device 530 and to the adjustment tabs 501 and 503. Support device 530 is constructed of a thin and flat flexible material such as steel. Adjustment tabs 501 and 503 each have a gripping surface 505 that is exposed to the user through a recess 527 in the face plate structure 524. Tabs 501 and 503 include an extension portion 506 with a detent 502 or knob located on the top side of the extension portion 506. The touchpad 400 and support device 530 are located within the hollow face plate structure 524. Face plate structure includes a bottom plate 540 with a hole 541 in the middle of the face plate structure 524 that enables the support device 530 to sag when in an inwardly non-planar form. The bottom plate 540 also includes a hole 550 for the mother board connector 415 to be attached to the motherboard.

An irregular groove 513 is cut in the edge of the palm rest 117 that surrounds the touchpad assembly recess 512. The irregular groove 513 forms a ledge portion 545 in the bottom portion of the palm rest panel 117. Also formed by the irregular groove 513 are indentations 517, 518, 519, and 520. The irregular groove 513 is shaped in such a way so as to allow the adjustment tabs 501 and 503 to slide away from the center of the touchpad assembly 500. The base portion 540 of the touchpad assembly 500 rests on the ledge portion 545.

Figure 6:
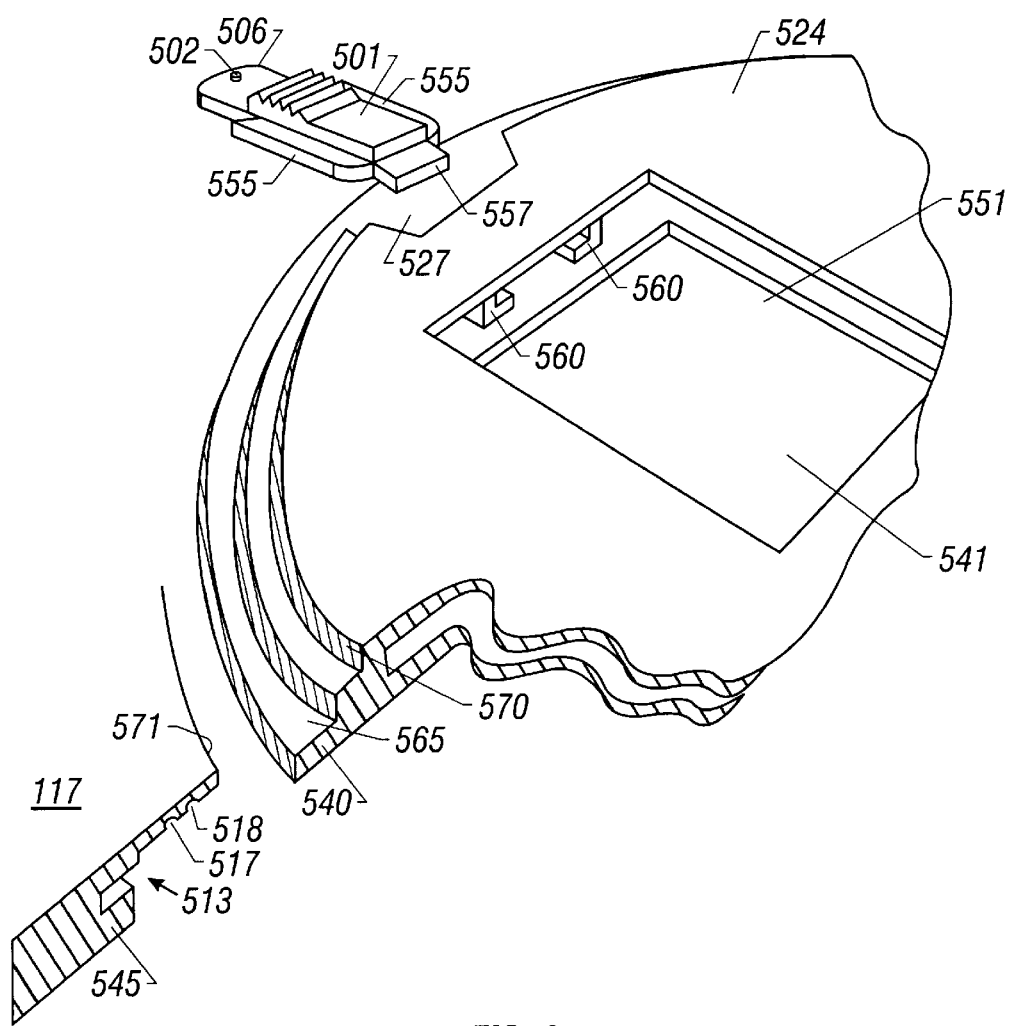
FIG. 6 shows a cutaway view of a portion of one embodiment a touchpad assembly.

FIG. 6 shows a perspective cutaway view of the face plate structure 524 and the edge of the touchpad assembly recess 512 in the palm rest panel 117. Adjustment tab 501 includes sliding rails 555 that support the tab 501 in the sliding track 560. Sliding track 560 is attached to the underside of the top surface panel of the faceplate structure 524 between the operating surface opening 551 and recess 527. The sliding track 560 allows the sliding tab 501 to move in a direction towards and away from the center of the touchpad assembly 500.

The irregular groove recess 513 encircles the edge of the palm rest panel 117 next to the touchpad assembly recess 512. In the embodiment shown, the indentations 517 and 518 are not continuos but instead are at discrete locations encircling the recess 512. The edge of the face plate structure 565 is also of an irregular cut and includes an upper side portion 570. When the touch pad assembly is in an operating position in the palm rest panel 117, the upper side portion is against the farthest edge 571 portion of recess 512, such that the top surface of the face plate structure and the palm rest 117 are flush or nearly flush. In this operating position, the touchpad assembly is rotatablely secured to the palm rest panel 117. The edge portion of faceplate structure 524 below the upper side portion 570 along with a portion of the extension 506 form a ledge that resides beneath the palm rest panel 117 in the irregular groove recess 513. This ledge prevents the touchpad assembly 500 from being removed by an upward force, yet allows the assembly 500 to be rotated in the recess 512.

The form of the operating surface 120 of touchpad 400 is determined by the position of tabs 501 and 503 relative to their location in indentations 517 -520. In FIG. 5A, the operating surface 120 of touchpad 400 is in an outwardly non-planar form. In this form, detent 502 of tab 501 resides in indentation 518 and detent 502 of tab 503 resides in indentation 519. In this position, the actual distance between the anchor pins 509 attached to tab 501 and anchor pins 509 attached to tab 503 is shorter than the length of the support device 530 between its attachment to anchor pins 509 at the same locations. Consequently, the support device 530 is bowed to account for this difference in distance. The force of the indentations 518 and 519 against the detents 502 provides the force needed to keep the support device 530 in the non-planar form.

FIG. 5B shows the operating surface 120 of touchpad 400 in a different operating position than in FIG. 5A. In FIG. 5B, the operating surface 120 has a planar form. In this planar form, detent 502 of tab 501 is located in indentation 517, and detent 502 of tab 503 is located in indentation 520. To change the operating surface form from an outwardly non-planar form in FIG. 5A to a planar form in 5B, the user slides tabs 501 and 503, in the sliding track 560, in a direction away from the center of the touchpad 400 to where detents 502 are in indentations 517 and 520, respectively. This has the effect of stretching out the support device 530 in a planar surface. The force provided by indentations 517 and 520 against the detents 502 of tabs 501 and 503 respectively, keeps the support device 530 in a planar form even when the user is tapping on the operating surface 120.

FIG. 5C shows the operating surface 120 in an other operating position where the operating surface 120 has an inwardly non-planar form. In this form, the tabs 501 and 503 are in the same position as with the outwardly non-planar form in FIG. 5A. To move the operating surface into an inwardly non-planar form as in FIG. 5C from a planar form in FIG. 5B, the user applies a force downward on the operating surface 120 while simultaneously moving the tabs 501 and 503 to their position as shown in FIG. 5C where detent 502 of tab 501 resides in indentation 518 and detent 502 of tab 503 resides in indentation 519. The force provided by indentations 518 and 519 against the detents 502 provides the support needed to keep the support device from sagging further downward.

To move the operating surface 120 from a planar form as in FIG. 5B to an outwardly non-planar form in FIG. 5A, the user moves the tabs 501 and 503 from their position as shown in 5B where detents 502 reside in indentations 517 and 520, respectively, to their position as shown in FIG. 5A where detents 502 resides in indentations 518 and 519, respectively. The support device 530 is biased upward by a non perceptible amount so as to naturally bend in an outwardly non-planar form when the tab 501 and 503 are moved in a direction towards each other from their position in FIG. 5B.

Figure 7:
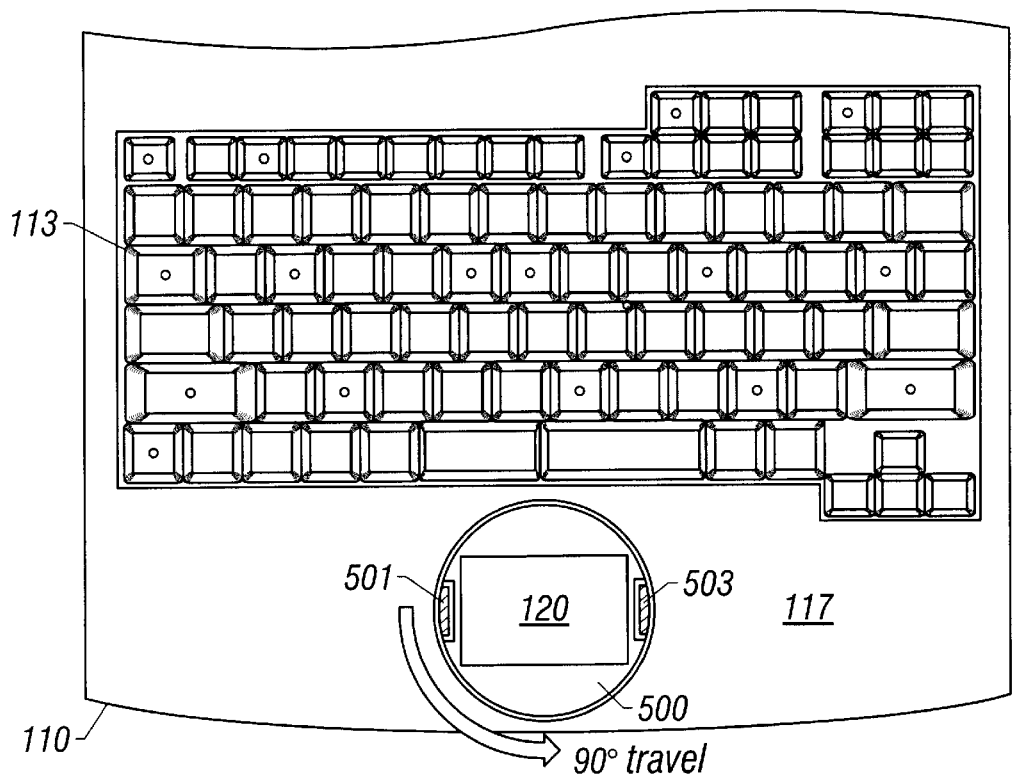
FIG. 7 shows a top view of one embodiment of a touchpad assembly in an operating position.
Figure 8:
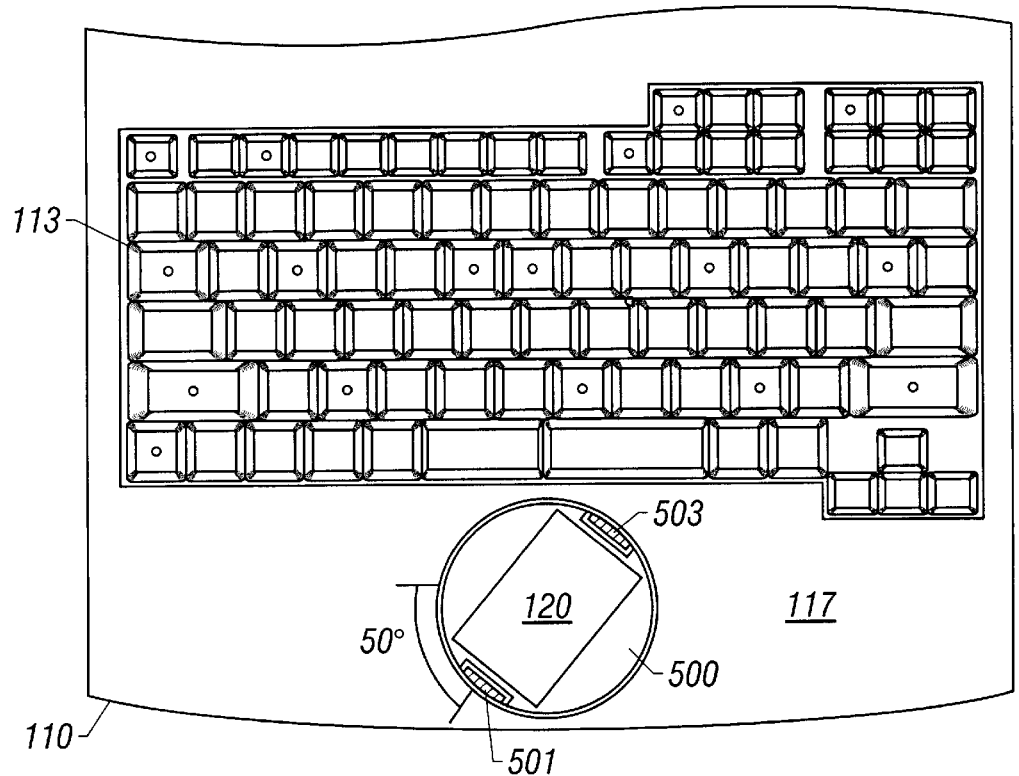
FIG. 8 shows a top view of one embodiment of a touchpad assembly in an operating position.
Figure 9:
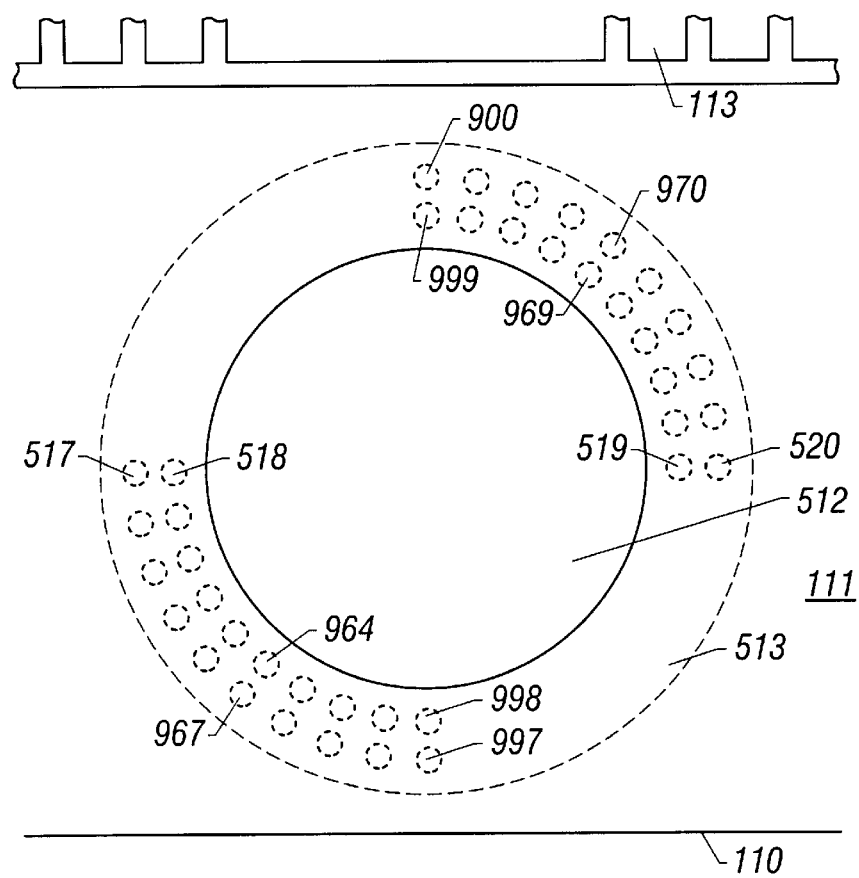
FIG. 9 shows a top view of a portion of a computer system.

Referring to FIGS. 7, 8, and 9, the operating position of the operating surface 120 may be adjusted in that the orientation of the operating surface 120 with respect to the base portion 110 may be rotated. FIG. 7 shows a first orientation of the touchpad assembly 500 where tabs 503 and 501 are located at the 3 o'clock and 9 o'clock positions, respectfully. In the embodiment shown, the touch pad assembly 500 is rotatable by 90 degrees in a counter clock wise direction, relative to the view shown in FIG. 7, to where tab 503 occupies the 12 o'clock position and tab 501 occupies the 6 o'clock position. However, the touch pad assembly in the embodiment shown may be positioned any where within that range. In FIG. 8, the touchpad assembly 500 has been rotated 50 degrees in the counter clockwise position from the position shown in FIG. 7. In this new position, tab 503 is between the 1 o'clock and 2 o'clock positions.

FIG. 9 shows a top view of the base portion 110 adapted to receive the touchpad assembly 500 (not shown). Shown in phantom is the extent of the irregular groove 513 in the underside portion of the edge of the palm rest panel 117 next to touchpad assembly recess 512. Also shown in phantom, are the locations of the indentations in the irregular groove 513 that partially encircle recess 512. Ten pairs of indentations are located on either side of recess 512. Each pair is located diagonally across the recess 512 from a corresponding pair. For example indentations 517 and 518 form a pair that is located diagonally across from indentation 519 and 520 which form the corresponding pair. The location of these corresponding pairs enable the touchpad assembly 500 to be rotated by ten degree increments up to a ninety degree maximum, relative to the base portion of the portable computer. Furthermore having a pair of indentations at each 10 degree increment enables the operating surface to exist in either a planar or non-planar form at each location.

Referring to FIG. 7, the touchpad assembly 500 is in a non-planar form in the first orientation. Thus, detents 502 of tabs 501 and 503 are in indentations 517 and 520 respectively. To rotate the touchpad assembly 500 fifty degrees in a counter clock wise direction from the first orientation, the user places their fingers on the gripping surfaces 505 of tabs 501 and 503 and applies a torque motion to rotate the touchpad assembly 500 in a counter clockwise direction. To move the touchpad assembly 50 degrees, the user moves the assembly 500 until detents 502 of tab 501 resides in indentation 967 and detent 502 of tab 503 resides in indentation 970. To rotate the touch pad assembly 500 ninety degrees from the first orientation, the user rotates the touchpad assembly to a position where detent 502 of tabs 501 and 503 reside in indentations 997 and 900 respectively.

In rotating the touchpad assembly, motherboard connector 415 must be long enough so as to move within the base portion 110 and still remain attached. The force of the detent 502 against the indentations prevents the touchpad assembly from accidentally rotating during operation.

In other embodiments, the indentations may be replaced with a circular ridges in the underside of the palm rest panel 117 that surround 90 degrees of recess 512 such that the detents 502 could occupy any location within the ridge. For example, one ridge would begin at the location where indentation 999 is located and end at the location where indentation 519 is located. The locations of all of the non-planar indentation on that side including 969 would be included in the circular ridge. These ridges would allow the touchpad assembly to be rotated to any orientation within the 90 degree track of the ridge, and not just in 10 degree increments as shown in FIG. 9.

Figure 10:
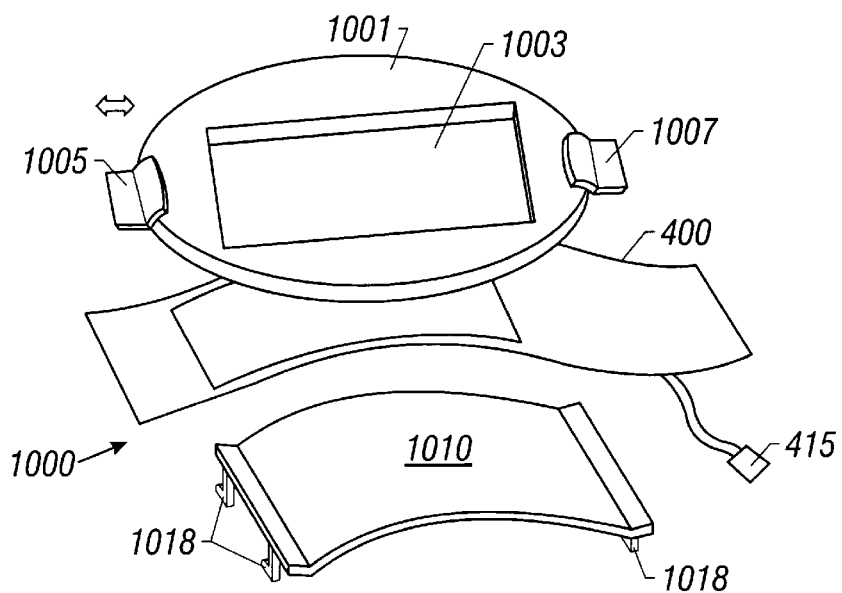
FIG. 10 shows a perspective view of parts of one embodiment of a touchpad assembly.

A second main embodiment of an adjustable touchpad assembly capable of providing an operating surface in a variety of operating positions is shown FIGS. 10–13. In this embodiment, a support device having a first form is interchanged with a support device having a second form. Referring to FIG. 10, touchpad assembly 1000 includes face plate 1001, touchpad 400, and support device 1010. Face plate 1001 is of a circular shape and is constructed of a flexible material such as steel which allows it to bend. Attached to the sides of the faceplate 1001 are attachment latches 1005 and 1007. Also included with face plate 1001 is an opening 1003 to expose the operating surface 120 of touch pad 400 to a user. Included beneath the touch pad is a support device 1010 having an outwardly non-planar shape. Protruding from the underside of the edges of the support device 1010 are four small snapfit tabs 1018 whose location forms the four corners of a square.

Figure 11:
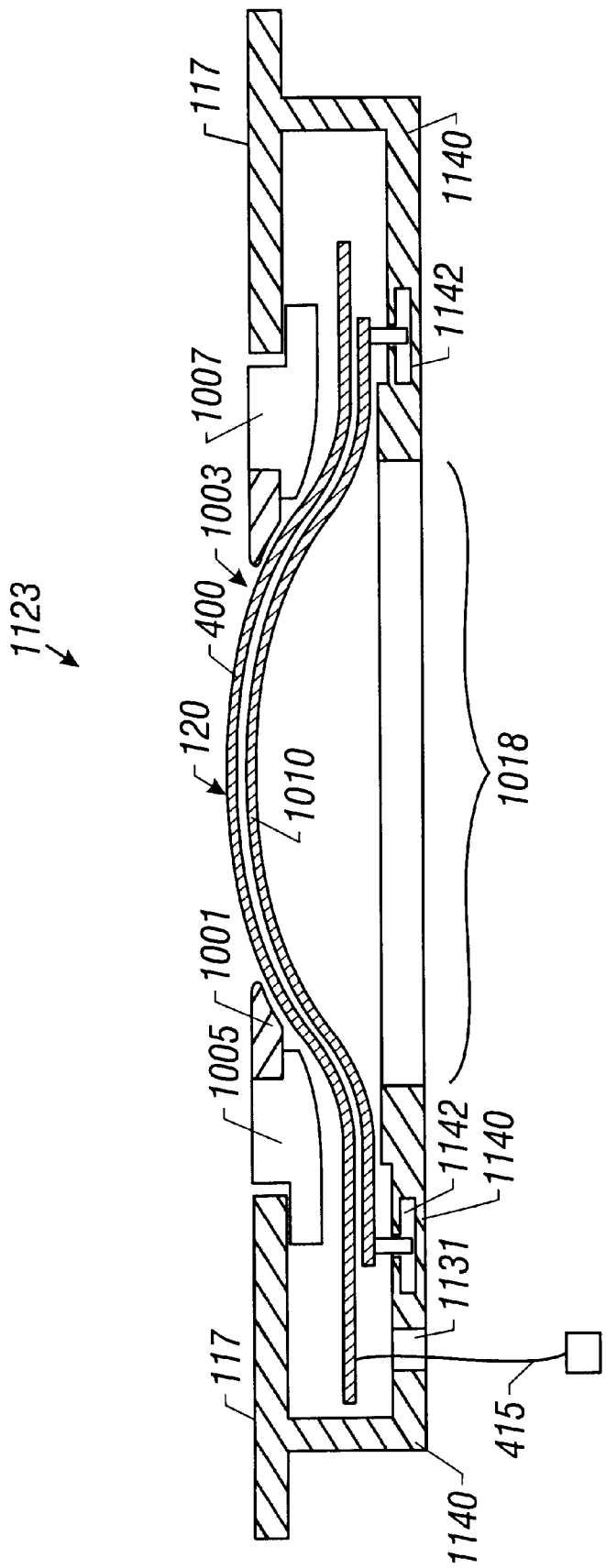
FIG. 11 shows a sectional view of one embodiment of a touchpad assembly in an operating position.

FIG. 11 shows a side profile view of touchpad assembly 1000 where the operating surface 120 is in an operating position. The touch pad assembly 1000 resides in a circular recess 1123 located in the palm rest panel 117. The support device 1010 rests on subpanel ledge 1140. Subpanel ledge 1140 is attached to the underside of the palm rest panel 117, or in an alternative embodiment, is supported from the interior of the base portion 110. The touch pad 400 lays on top of the support device 1010. The face plate 1001 lays on top of the touchpad with the operating surface 120 exposed through opening 1003. Latches 1005 and 1007 hold the face plate within the recess 1123. The snapfit tabs 1018 are latching devices used to removablely attach the support device 530 to the subpanel 1140 through slots 1142 in the subpanel surface. In the embodiment shown, the slots are recesses in the subpanel 1140 with slightly narrower openings that allow a snapfit tab to penetrate the narrower opening to be removable secured to the slot. Also included in subpanel 1140 is an opening 1131 for the motherboard connector 415.

Figure 12A:
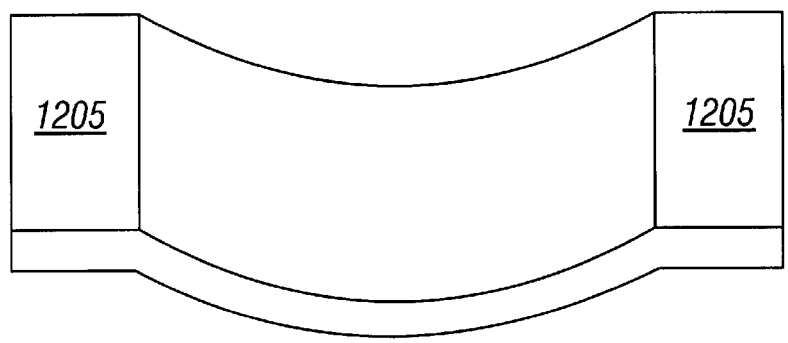
FIG. 12 A–C shows a perspective view of parts of one embodiment of a touchpad assembly.
Figure 12B:
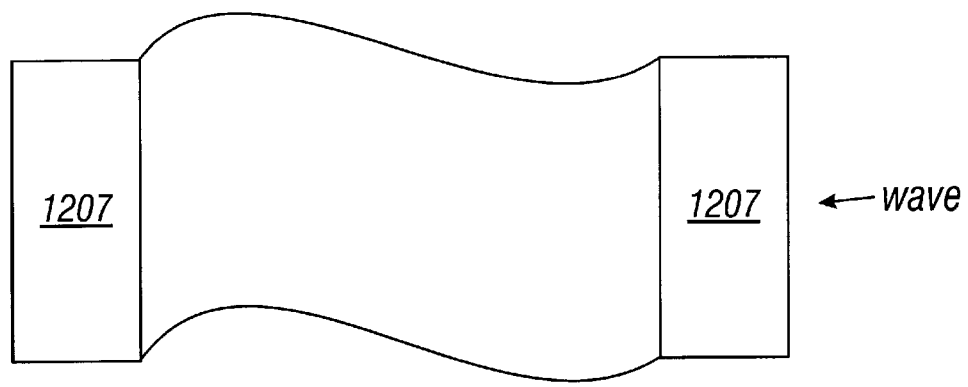
Figure 12C:
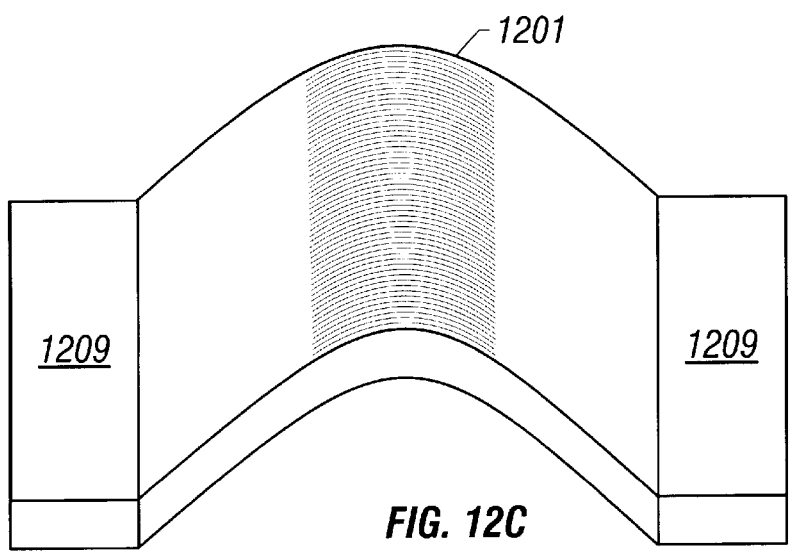

Referring to FIG. 12A–C, support devices of different forms may used with touchpad assembly 1000. The support device in FIG. 12A would provide the operating surface with an inwardly non-planar form. The support device in 12B would provide the operating surface 120 with a curvy or wavy shape that allows the user large vertical component of the touchpad accessible from a specific side. Thus if a person favored either the right or left hand in using the touch pad, they could orient the vertical component towards that hand. FIG. 12C shows a touch pad having a form with a blunt ridge 1201 in the center portion. In the embodiments shown, each support device includes flat edge portions 1205, 1207 and 1209 for laying on the subpanel ledge 1140. The support devices include snapfit tabs (not shown) for attaching the support device to the subpanel 1140.

The procedure for changing the form of the operating surface 120 of touch pad 400 in touchpad assembly 1000 is described below. Initially, the touchpad assembly 1000 is in an operating position in recess 1123 similar to that of touchpad assembly 119 in FIG. 1. The user first pinches the latching tabs 1005 of 1007 of face plate 1001 towards each other. Because the face plate 1001 is flexible, the face plate bows together to where at least one of the latches is clear of the edge of the palm rest panel 117 adjacent to the recess 1123. Once one of the tabs is clear, the user grabs the face plate 1001 and removes it from the computer system 101. Next the user grabs an end portion of the touch pad 400 and pulls that end out of the recess 1123 away from the support device 1010 with the other end of the touchpad 400 having the mother board connector 415 still residing in the recess 1123. Pulling back the touchpad 400 exposes the support device 1010. The user then grabs the support device 1010 to unattach the support device 1010 from the subpanel 1140.

The user next takes a new support device having a different form and inserts the snapfit tabs of that support device (similar to items 1018 in FIG. 10) into the narrow openings of subpanel slots 1142. The user then presses down on the new support device 1010 to snap the snaptabs into slots 1142 to removablely attach the new support device to the subpanel 1140. The user then lays the touchpad 400 over the new support device. Afterwards, the face plate 1001 is installed by inserting one latch 1005 underneath the edge portion of the palm rest panel 117 next to recess 1123 and bending the face plate 1001 so that the other latch 1007 can be inserted underneath the opposite edge of the palm rest panel 117. From this point, the face plate 1001 flattens into the position shown in FIG. 11.

Figure 13:
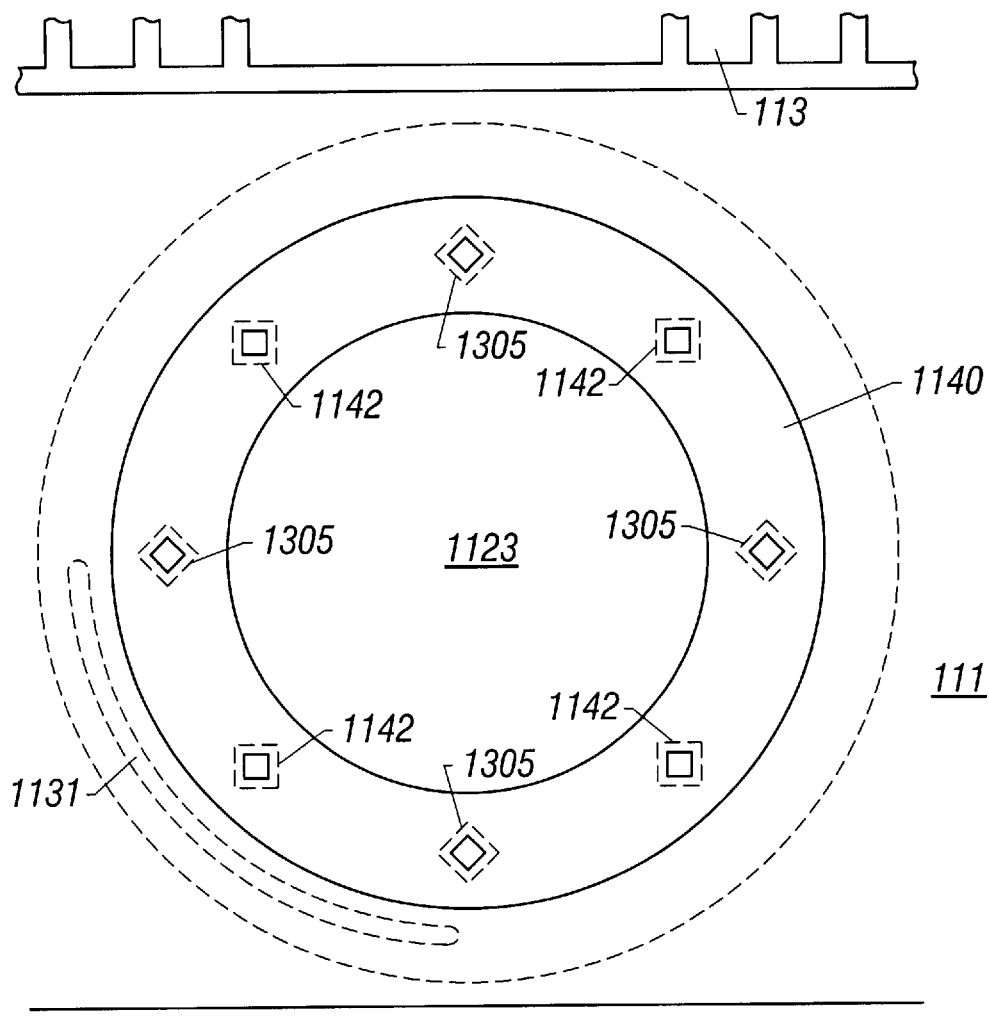
FIG. 13 shows a top view of a portion of a computer system.

FIG. 13 shows a top view of the base portion 110 of the portable computer 101 configured to support touch pad assembly 1000 (not shown). Each slot 1142 in the subpanel ledge 1140 is designed in such a way that the position of the support device 1010 in FIG. 11 may rotated by 90, 180 and 270 degrees and still be able to be removablely attached to the subpanel 1140 with the snapfit tabs 1018. Slots 1142 are of a square shape(shown in phantom) with a narrower square shape opening and are located in a pattern that forms the four corners of a square. This allows the position of the support device 1010 to be rotated by 90 degrees in either direction or 180 degrees and still be able to be removablely attached to the subpanel 1140. Also shown in phantom, is the hole 1131 for the motherboard connector 415.

The subpanel ledge 1140 includes a second set of four slots 1305 in which the snapfit tabs 1018 of support device 1010 can be inserted. The slots 1305 are of similar construction to slots 1142. The location of slots 1305 forms the four corners of a square that is rotated by 45 degrees from the square formed by the locations of slots 1142. When support device 1010 is secured in slots 1305, the support device 1010 can be positioned in orientations 45 degrees from the orientations available from using slots 1142. Thus, the orientation of operating surface 120 may rotated by 45 degree increments with respect to the base portion 110 of the portable computer 101. In other embodiments, the operating surface 120 may be rotated in smaller increments by increasing the number of sets of slots in the subpanel ledge 1040.

In other embodiments, other methods for removablely attaching the support device 1010 to the subpanel 1140 may be used. other attaching devices including snaps, spring latches, snap hooks, hinges, ridges, clamps, clips, other types of hooks, or a combination thereof may be used.

The advantage of this embodiment is that the support device may be removed without disconnecting or decoupling the touchpad from the motherboard of the computer system 101. Also, the form or orientation of the operating surface of the touchpad can be change without having to remove any panels of the base portion 110 of the computer. Thereby allowing the operating position of the operating surface to be adjusted by a user while the computer is running. These advantages enable a computer user to conveniently and inexpensively change the operating position of the operating surface 120 even after the user has long purchased the computer system 101.

Figure 14:
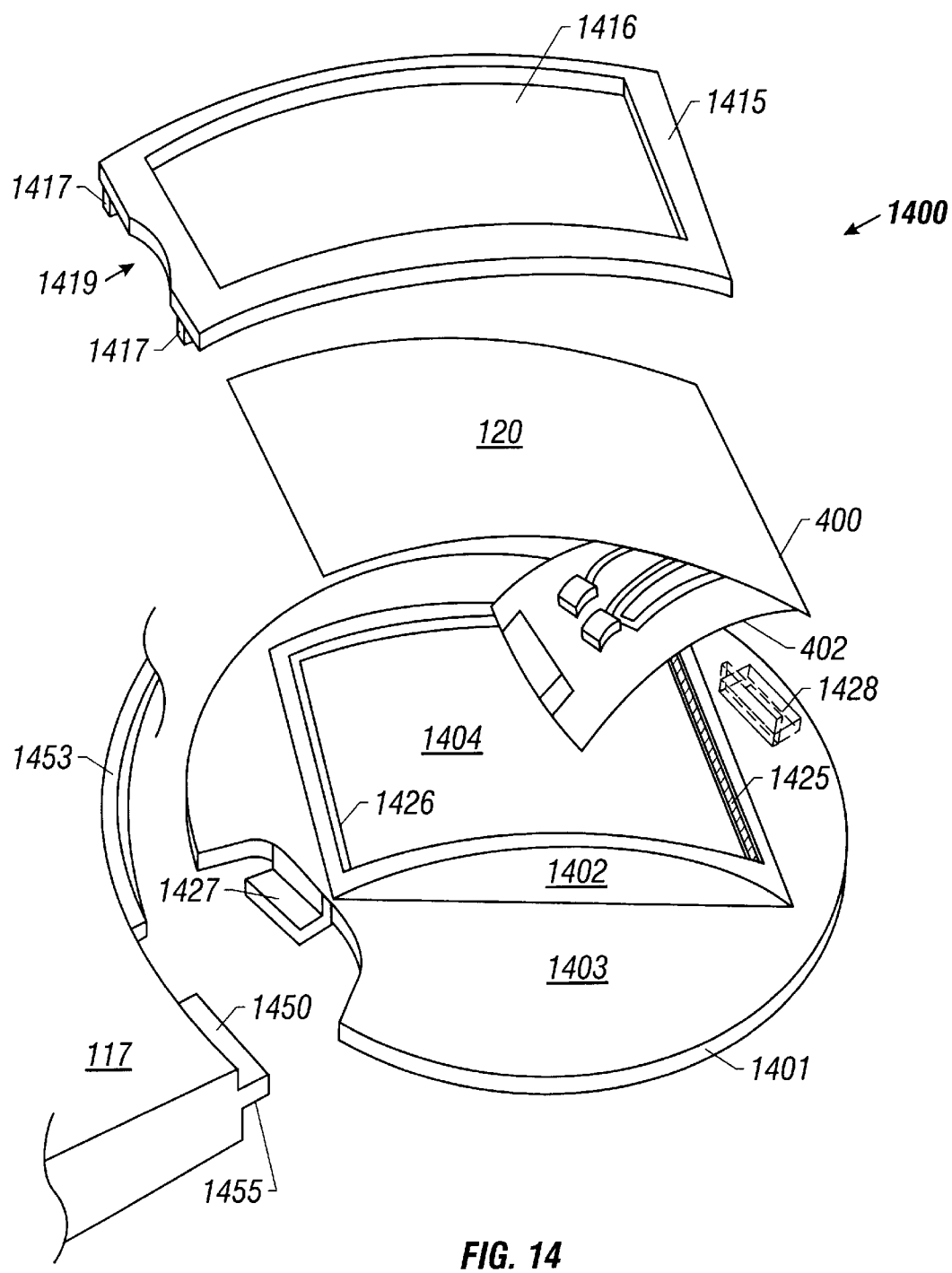
FIG. 14 shows a perspective view of a portion of one embodiment a touchpad assembly.

Referring to FIG. 14, the second main embodiment of the present invention may be modified by supporting the touchpad assembly directly from the top surface of the palm rest 117. FIG. 14 shows touchpad assembly 1400 which includes a support device 1401, a touchpad 400, and a face plate 1415. Support device 1401 includes a supporting portion 1402 attached to the top of a base portion 1403. The supporting portion 1402 includes a recess 1404 that extends through the support device 1401 for receiving the operating surface 120 of touchpad 400. A slot 1425 is located along the edge the recess 1404. The slot 1425 is long enough and wide enough for the touchpad operating surface 120 to slide through when the support device 1402 is removed from the palm rest 117. The supporting portion 1402 has an outwardly non-planar arch form such that when the operating surface 120 of the touchpad 400 lies in recess 1404, the operating surface 120 forms an arch.

When the operating surface 120 is lying in the recess 1404 in an operating position, the substrate 402 is fitted through slot 1425 where the motherboard connector 415 (not shown in FIG. 14) is connected to the motherboard. In an operating position, the face plate 1415 covers the operating surface 120. Face plate 1415 is removablely attached to the supporting portion 1402 with attaching snaps 1417. The attaching snaps 1417 snap into the edge portion 1426 of the recess 1404. Also included in the face plate is a finger nail recess 1419. When in the operating position where the face plate 1415 is attached to the supporting portion 1402, figure nail recess 1419 allows the user to apply a force upwards on the face plate 1415 to unsnap the attaching snaps 1417. The face plate 1415 also includes an opening 1416 for exposing the operating surface 120 to the user in an operating position.

Figure 15:
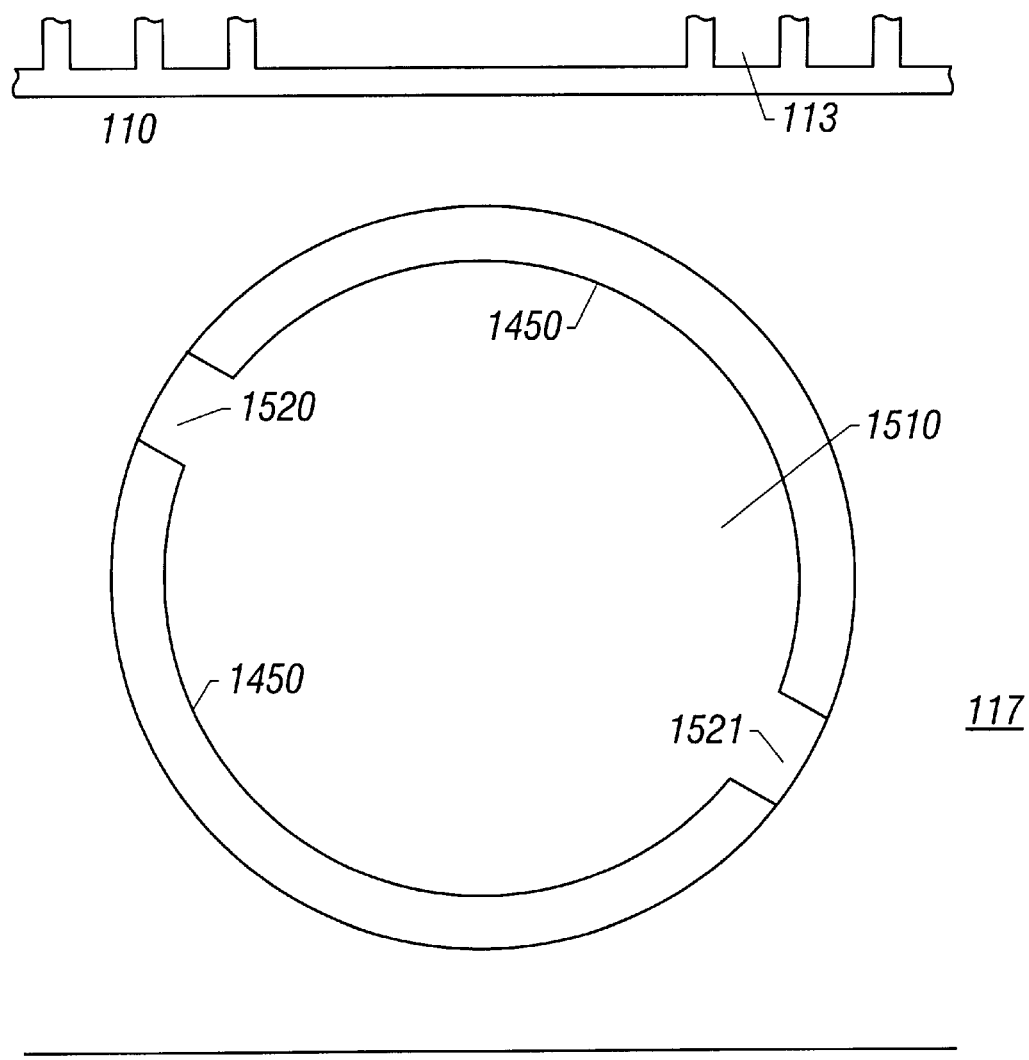
FIG. 15 shows a top view of a portion of a computer system. The use of the same reference symbols in different drawings indicates similar or identical items.

The base portion 1403 is of circular plate shape so as to allow the support device 1401 to rotate within the circular touchpad assembly recess 1510 (FIG. 15). Attached to the bottom base portion 1403 are two L shaped bayonet ledges or ledges 1427 and 1428.

FIG. 14 also shows a cut away view of the edge of the palm rest panel 117 located next to recess 1510. A ridge 1450 extends out from the side of the edge of the palm rest panel 117. The ridge 1450 includes a top side edge 1453 and a bottom side edge 1455. The bottom part of the base portion 1403 fits within the recess 1510 and is supported by the top edge 1453.

FIG. 15 shows the top view of a computer system 101 adapted to receive touchpad assembly 1400. Recess 1510 is located in the palm rest panel 117. Two recess 1520 and 1521 are located in ridge 1450 on opposite sides of the recess 1510. Recesses 1520 and 1521 allow the ledges 1427 and 1428 to be placed within the recess 1510 when the support device 1401 is placed in recess 1510. To slidably secure and removably attach the support device 1401 to the palm rest 117, the user moves or rotates the support device 1401 so that the ledges 1427 and 1428 resides underneath the bottom side 1455 of ridge 1450.

To change the form of the operating surface 120 in touchpad 1400, the user pops off the face plate 1415 using a finger nail to apply an upward force on the face plate 1415 at finger nail recess 1419. From this point, the user rotates the support device 1401 to where the ledges 1427 and 1428 line up with recesses 1520 and 1521. The user then removes the support device 1401 from the palm rest 117 while simultaneously moving the operating surface 120 through slot 1425 until the operating surface 120 is completely clear of the support device 1401.

The user then selects a second support device of a second form (not shown). The user then feeds the operating surface through a slot in second support device similar to slot 1425. Afterwards the user lines up the ledges of the new support device which are similar to ledges 1427 and 1428 and places the support device on the topside 1453 of ridge 1450. The user moves or rotates the support device 1401 so that the ledge 1410 resides underneath the bottom side 1455 of ridge 1450 to slidably secure the support device 1401 to the palm rest 117.

To rotate the touchpad assembly 1400 within the recess 1510, the user simply rotates the support device 1401 to a desired orientation. Ledges 1427 and 1428 are bent slightly upward so as to apply a force against the bottom side 1455 of ridge 1450 so as to prevent the support device 1401 from rotating during use of the operating surface 120.

In an alternative embodiment, ledges 1427 and 1428 include detents, and the bottom edge 1426 includes indentations to aid in preventing the support device 1401 from moving or rotating during use of the operating surface.

OTHER EMBODIMENTS

In an alternative embodiment, the touchpad assembly can be mounted in an operating position in a keyboard unit of a stationary computer, where the keyboard is moveable with respect to the box encasing the motherboard. Therefore, adjusting the touchpad to change the orientation relative to the computer system in this embodiment would mean adjusting the touchpad to change the orientation relative to the keyboard unit.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A computer system comprising:

a processor;

a display, electrically coupled to the processor;

a touchpad assembly including:
  a touchpad having an operating surface, the operating surface electrically coupled to the processor;
  wherein the touchpad assembly is capable of providing the operating surface in a plurality of forms;

a housing, the housing supporting the touchpad assembly;

a keyboard physically coupled to the housing, the keyboard electrically coupled to the processor;

wherein the touchpad assembly including one of a plurality of support devices, each support device supporting the operating surface in a different form, each support device capable of being removablely attached to the housing;

wherein the housing including a panel having a recess;

wherein the panel having an edge adjacent to the recess;

wherein each support device including a ledge, the ledge capable of being inserted into the recess;

wherein each support device capable of being moved to where a portion of the ledge resides beneath the edge of the housing to removablely attach the support device to the housing.

2. The computer system of claim 1 wherein:

the housing including a set of at least one recess;

each support device including at least one attaching device, capable of residing in the set of at least one recess to removablely attach the support device to the housing.

3. The computer system of claim 1 wherein:

the operating surface capable of providing signals to the processor in a plurality of orientations with respect to the computer system.

4. A computer system comprising:

a processor;

a display, electrically coupled to the processor;

a touchpad assembly including:
  a touchpad having an operating surface, the operating surface electrically coupled to the processor;
  wherein the touchpad assembly is capable of providing the operating surface in a plurality of forms;

wherein the touchpad assembly further includes a support device for supporting the operating surface in an operating position, the support device capable of supporting the operating surface in the plurality of forms;

wherein the touchpad assembly further including a tab, the tab accessible from the outside of the touchpad assembly, the tab attached to the support device at a location, the tab capable of residing in a first position in the touchpad assembly, the operating surface of a first form when the tab resides in the first position, the tab capable of residing in a second position, the operating surface of a second form when the tab is in the second position.

5. The computer system of claim 4 wherein:

the support device being bendable from a first support form wherein the operating surface has a first form to a second support form wherein the operating surface has a second form.

6. A computer system comprising:

a processor;

a display, electrically coupled to the processor;

a touchpad assembly including:
   a touchpad having an operating surface, the operating surface electrically coupled to the processor;
   wherein the touchpad assembly is capable of providing the operating surface in a plurality of forms;

a housing, the housing supporting the touchpad assembly;

a keyboard physically coupled to the housing, the keyboard electrically coupled to the processor;

wherein the touchpad assembly including a support device, the support device supporting the operating surface, the support device capable of supporting the operating surface in a plurality of operating surface orientations with respect to the housing.

7. The computer system of claim 6 wherein:

the support device being removablely attached to the housing, the support device capable of being removablely attached in a first plurality of support orientations with respect to the housing, where each one of the plurality of support orientation corresponds to one of a plurality of operating surface orientations.

8. The computer system of claim 7 wherein:

the housing including a set of at least one recess;

the support device including at least one attaching device capable of residing in the set of at least one recess to removablely attach the support device to the housing;

the attaching device capable of residing in the set of at least one recess in a plurality of attaching device orientations with respect to the housing where each one of the plurality of attaching device orientations corresponds to one of a plurality of operating surface orientations.

9. The computer system of claim 8 wherein:

the housing including a second set of at least one recess;

the attaching device capable of residing in the second set of at least one recess in a second plurality of attaching device orientations with respect to the housing where each one of the second plurality of attaching device orientations corresponds to one of a second plurality of operating surface orientations.

10. The computer system of claim 6 wherein:

the touchpad assembly including a ledge;

the housing including a panel having a recess;

the panel having an edge adjacent to the recess;

a portion of the ledge residing beneath the panel to rotatablely secure the touchpad assembly to the housing;

the touchpad assembly rotatable to a plurality of support orientations with respect to the housing, where each of one of a plurality of support orientations corresponds to one of a plurality of operating surface orientations.

11. The computer system of claim 10, wherein:

the ledge includes a detent;

the panel includes an underside, the underside having a plurality of indentations, wherein when the operating surface is in a first orientation, the detent resides in a first indentation, when the operating surface is in a second orientation, the detent residing in a second indentations, the detent residing in one of the plurality of indentations to provide a force on touchpad assembly resisting rotation.

12. A method for inputting data into a computer system comprising:

providing a touchpad with an operating surface;

electrically coupling the operating surface to a processor of the computer system;

positioning the operating surface in an operating position where the operating surface has a first form;

adjusting the form of the operating surface of the touchpad to a second form;

inputting data into the computer system using the operating surface of the touchpad;

providing a support device, the support device supporting the operating surface in the first form, the support device having first portion and a second portion, the first portion located at a first distance from the second portion when the operating surface is in first form, wherein the adjusting the form of the operating surface includes positioning the first portion at a second distance from the second portion.

13. The method of claim 12 wherein the adjusting further includes:

bending the operating surface of the touchpad to a second form.

14. The method of claim 12 wherein:

the operating surface having a first edge portion and a second edge portion;

when in the first form, the first edge portion located at a first distance from the second edge portion;

the adjusting further includes positioning the first edge portion at a second distance from the second edge portion.

15. The method of claim 12 wherein:

the electrically coupling the operating surface to a processor includes electrically coupling the operating surface to a motherboard;

the adjusting includes adjusting the operating surface without decoupling the operating surface from the mother board.

16. The method of claim 12 wherein:

the computer system is a portable computer with a base portion;

the positioning includes physically securing the touch pad to the base portion.

17. The method of claim 12 further comprising:

selling the computer system to a consumer, the consumer performs the inputting data and adjusting the touchpad.

18. The method of claim 12 wherein:

a user performs the adjusting without the aid of a tool.

19. A method for inputting data into a computer system comprising:

providing a touchpad with an operating surface;

electrically coupling the operating surface to a processor of the computer system;

positioning the operating surface in an operating position where the operating surface has a first form;

adjusting the form of the operating surface of the touchpad to a second form;

inputting data into the computer system using the operating surface of the touchpad;

wherein the positioning and the adjusting further include:
   providing a first support device, the first support device supporting the operating surface in the first form in an operating position;
   removing the first support device so that the first support device no longer supports the operating surface;

providing a second support device, the second support device supporting the operating surface in the second form.

20. The method of claim 19 wherein:

the providing a first support device further includes removably attaching the support device to a structure coupled to the computer system;

the removing the first support device further includes unattaching the support device from the structure;

the providing a second support device further includes removably attaching the second support device to the structure.

21. The method of claim 20 comprising:

physically coupling a keyboard to the structure;

coupling the keyboard to the processor.

22. The method of claim 22 wherein:

the removably attaching the first support device to the structure further includes:

providing a ledge physically coupled to the first support device;

providing a recess in a panel of the structure;

placing the ledge within the recess in the structure;

moving the first support device so that a portion of the ledge moves beneath a portion of the panel adjacent to the recess to secure the first support device to the structure;

the removing the first support device further includes:

moving the support device so that the ledge is not beneath a portion of the panel;

the removably attaching the second support device to the structure further includes:

providing a second ledge physically coupled to the second support device;

placing the second ledge within the recess;

moving the second support device so that a portion of the second ledge moves beneath a portion of the panel adjacent to the recess to secure the second support device to the panel.

23. A method for inputting data into a computer system comprising:

providing a touchpad with an operating surface;

electrically coupling the operating surface to a processor of the computer system;

positioning the operating surface in an operating position where the operating surface has a first form;

adjusting the form of the operating surface of the touchpad to a second form;

inputting data into the computer system using the operating surface of the touchpad;

providing a housing with a keyboard physically coupled to the housing, the keyboard electrically coupled to the processor, the operating surface having a first operating surface orientation relative to the housing;

moving the operating surface from the first operating surface orientation to a second operating surface orientation relative to the housing.

24. The method of claim 23 further comprising:

proving a support device, the support device supporting the operating surface in an operating position;

supporting the support device with the housing in a first support orientation relative to the housing, the support device in the first support orientation supporting the operating surface in the first operating surface orientation;

wherein the moving the operating surface from a first operating surface orientation to a second operating surface orientation further includes moving the support device from the first support orientation to a second support orientation relative to the housing, the support device in the second support orientation supporting the operating surface in the second operating surface orientation.

25. The method of claim 24 wherein:

moving the support device from the first support orientation to the second support orientation includes applying a force to rotate the support device from the first support orientation to the second support orientation.

26. The method of claim 25 further comprising:

providing a detent in the outer surface of the support device;

proving a first indentation in the housing and a second indentation in the housing;

wherein when the support device is in the first support orientation, the detent resides in the first indentation;

wherein when the support device is in he second support orientation, the detent resides in the second indentation.

27. The method of claim 24 wherein:

the supporting the support device with the housing includes removably attaching the support device to the housing in the first support orientation;

the moving the support device from a first support orientation to a second orientation includes:

unattaching the support device from the housing;

removably attaching the support device to the housing in a second support orientation.

28. The method of claim 27 further comprising:

providing a first set of at least one recess in the housing;

providing a second set of at least one recess in the housing;

providing at least one attaching device physically coupled to the support device; wherein:

the removably attaching the support device to the housing in the first support orientation includes attaching the at least one attaching device to the first set of at least one recess;

the unattaching the support device includes unattaching the at least one attaching device from the first set of at least one recess;

the removably attaching the support device to the housing in the second support orientation includes attaching the at least one attaching device to the second set of at least one recess.

* * * * *